(No Model.)

G. H. IVES.
NUT LOCK.

No. 464,303. Patented Dec. 1, 1891.

Witnesses
J. N. Shumway
Lillian D. Kelsey

George H. Ives
Inventor
By Attys.
Earle & Seymour

UNITED STATES PATENT OFFICE.

GEORGE H. IVES, OF MYSTIC, CONNECTICUT.

NUT-LOCK.

SPECIFICATION forming part of Letters Patent No. 464,303, dated December 1, 1891.

Application filed March 16, 1891. Serial No. 385,196. (No model.)

*To all whom it may concern:*

Be it known that I, GEORGE H. IVES, of Mystic, in the county of New London and State of Connecticut, have invented a new Improvement in Nut-Locks; and I do hereby declare the following, when taken in connection with accompanying drawings, and the letters of reference marked thereon, to be a full, clear, and exact description of the same, and which said drawings constitute part of this specification, and represent, in—

Figure 1:
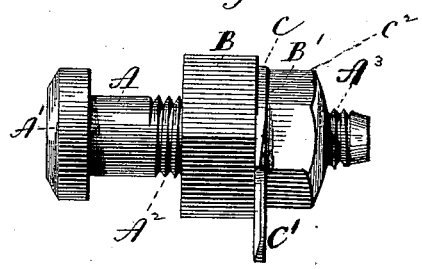
Figure 2:
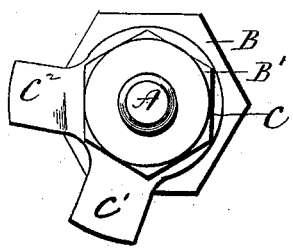
Figure 3:
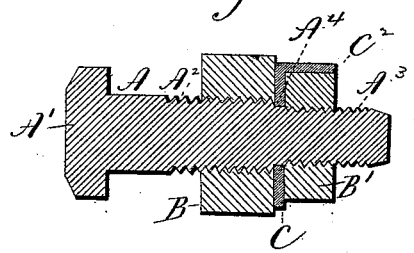
Figure 4:
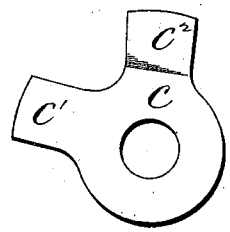
Figure 5:
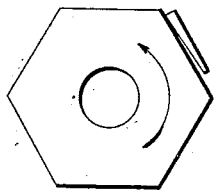

Figure 1, a view in side elevation of a nut-lock constructed in accordance with my invention; Fig. 2, a view thereof in end elevation, looking toward the nuts; Fig. 3, a view of the device in longitudinal section, showing one of the locking-fingers of the washer turned down; Fig. 4, a detached view, in front elevation, of the washer; Fig. 5, an end view in the nature of a diagram, showing how, by beveling the fingers of the washer, they are caused to first strike the faces of the nut at points in advance of the axial center thereof, whereby the nut is thus urged forward and tightened.

My invention relates to an improvement in nut-locks, the object being to produce a simple, cheap, durable, and reliable device.

With these ends in view my invention consists in a bolt having right and left hand threads and constructed with an annular shoulder located between the same, two nuts adapted to fit over the said threads, and a washer interposed between the nuts and constructed with two or more locking-fingers, which are beveled or made of wedge shape in transverse section, their thicker edges being located adjacent to the forward ends of the faces of the nuts with respect to the direction in which the same are turned for tightening, whereby the said fingers, when turned down, will always tend to turn the nuts forward, and thus tighten them.

The bolt A, having the head A', is provided with left-hand threads $A^2$ and right-hand threads $A^3$, between which an annular shoulder $A^4$ is formed by reducing the outer end of the bolt, which is provided with the right-hand threads $A^3$. B and B' are nuts respectively adapted to fit over the left and right hand threads of the bolt. A washer C, interposed between the said nuts and having bearing against the shoulder $A^4$, hereinbefore mentioned, is provided with two locking-fingers C' and $C^2$, which are relatively arranged so that when turned down in opposite directions they will engage with faces of the nuts and prevent the same from turning. The said fingers are beveled or made wedge-shaped in transverse section, so that when turned down they will force the nuts forward, the thicker ends of the fingers being arranged to engage with the forward ends of the faces of the nuts, and by this term I mean those ends of the faces of the nuts which are in advance with respect to the direction in which the nuts are turned to tighten them. By beveling the fingers in this way they will always tend, when turned down, to drive the nuts forward rather than rearward, no matter at what angle they may engage with the faces of the nuts, which cannot, of course, be relied upon to be turned square with the fingers before the same are turned down.

I am aware that a nut-lock having a bolt made with right and left hand threads separated by an annular shoulder is not new, and that it is old to use a washer having fingers which are turned down upon the faces of the nuts. I do not therefore claim either of those constructions broadly; but, Having fully described my invention, what I claim as new, and desire to secure by Letters Patent, is—

In a nut-lock, the combination, with a bolt provided with right and left hand threads and with an annular shoulder located between the same, of two nuts adapted to fit over the said threads, and a washer interposed between the nuts and constructed with two or more locking-fingers, which are oppositely beveled or made wedge-shaped in transverse section, their thicker edges being located adjacent to the forward ends of the faces of the nuts with respect to the direction in which the same are turned for tightening, and whereby the said fingers, when turned down, will always tend to turn the nuts forward, and thus tighten them, substantially as described.

In testimony whereof I have signed this specification in the presence of two subscribing witnesses.

GEORGE H. IVES.

Witnesses:
H. B. NOYES,
A. H. SIMMONS.